United States Patent
Desantis et al.

(10) Patent No.: US 6,827,856 B2
(45) Date of Patent: Dec. 7, 2004

(54) PROCESS FOR THE RECOVERY OF COPPER FROM AQUEOUS SOLUTIONS CONTAINING IODINATED ORGANIC COMPOUNDS

(75) Inventors: Nicola Desantis, Milan (IT); Salvatore Incandela, Milan (IT)

(73) Assignee: Bracco Imaging S.p.A., Milan (IT)

(*) Notice: Subject to any disclaimer, the term of this patent is extended or adjusted under 35 U.S.C. 154(b) by 177 days.

(21) Appl. No.: 10/149,592

(22) PCT Filed: Dec. 11, 2000

(86) PCT No.: PCT/EP00/12505

§ 371 (c)(1), (2), (4) Date: Jul. 9, 2002

(87) PCT Pub. No.: WO01/44521

PCT Pub. Date: Jun. 21, 2001

(65) Prior Publication Data

US 2003/0057161 A1 Mar. 27, 2003

(30) Foreign Application Priority Data

Dec. 15, 1999 (IT) .......................................... MI99A2593

(51) Int. Cl.⁷ .............................................. B01D 61/00
(52) U.S. Cl. ...................... 210/651; 210/652; 210/660; 210/688; 423/19; 423/502; 423/486
(58) Field of Search ................................ 210/650, 651, 210/652, 660, 661, 688, 912; 423/19, 486, 502, 462, 493; 430/344

(56) References Cited

U.S. PATENT DOCUMENTS

| 4,290,894 A | * | 9/1981 | Torok et al. ................. 210/661 |
| 5,252,223 A | | 10/1993 | Goodman et al. |

FOREIGN PATENT DOCUMENTS

| DE | 22 54 649 A | 5/1973 |
| EP | 0 106 934 A | 5/1984 |
| WO | 87/02273 A | 4/1987 |
| WO | 00/32303 A | 6/2000 |

OTHER PUBLICATIONS

Database WPI; Section Ch, Week 198511; Derwent Publications Ltd., London, AN 1985–065515, XP002165250, and JP 60 021342 A, Sanshin Mfg Co. Ltd, Feb. 2, 1985.

* cited by examiner

*Primary Examiner*—W. L. Walker
*Assistant Examiner*—K S Menon
(74) *Attorney, Agent, or Firm*—Nixon & Vanderhye P.C.

(57) ABSTRACT

The present invention relates to a process for recovering copper from solutions from the recovery of iodine from industrial wastes from the production of ionic and non-ionic iodinated X-ray contrast agents by use of chelating resins suitable for removing copper from aqueous solutions. The absorbed copper is displaced by treating the resins with a 10% hydrochloric or sulfuric acid solution.

8 Claims, No Drawings

PROCESS FOR THE RECOVERY OF COPPER FROM AQUEOUS SOLUTIONS CONTAINING IODINATED ORGANIC COMPOUNDS

This application is the U.S. national phase of international application PCT/EP00/12505 filed 11 Dec. 2000, which designated the US.

The present invention relates to a process for the recovery of copper contained in solutions from the recovery of iodine from industrial waste streams from the production of ionic and non-ionic iodinated X-ray contrast agents. The process is particularly valuable when the above mentioned waste streams derive from the recovery of iodine by mineralization with finely dispersed metal copper and copper ion solutions.

The recovery of iodine from solutions containing iodinated organic compounds, in particular ionic and non-ionic X-ray contrast agents, is the solution to a both environmental and economic problem.

Iodine has, in fact, to be recovered from the effluents and waste streams from the production of 2,4,6-triiodo-1,3-benzenedicarboxylic acid derivatives due to its high intrinsic cost as well as to the need for reducing the environmental impact deriving from its production.

Law regulations in many Countries have in fact established very strict standards, setting the presence of organic aromatic compounds in waste streams namely to some ppm.

In particular, Italian law does not allow wastes to contain above 0.4 ppm of organic aromatics: it is therefore mandatory for such molecules to undergo degradation while recovering iodine.

This problem has been known for some time, and a number of patent applications concerning the process for the recovery of iodine have been filed (see, for instance: WO 98/07661, WO 94/10083, EP 106934).

More particularly, EP 106,934 discloses a process for the mineralisation of iodine, which comprises heating the recovery solutions containing the ionic and non-ionic contrast agents for a time of 30 minutes-2 hours at a temperature of 100–150° C. in the presence of strong alkali and copper ions or finely dispersed copper in amounts ranging from 100 to 2,500 ppm, which can be a further environmental problem.

Patent application WO 00/32303 discloses a process further improving the conditions for the recovery of iodine from industrial wastes from the production of ionic and non-ionic iodinated X-ray contrast agents.

According to the cited patents, iodine can be recovered by use of oxidizing agents such as manganese dioxide, sodium chlorate, hydrogen peroxide, chlorine, sodium hypochlorite, nitrous acid.

Notwithstanding the various patents concerning processes for the mineralisation and recovery of iodine which make use of copper ions or finely dispersed copper, the problem of the recovery of copper from the mineralisation final solutions has yet to be solved.

The toxicity of metals is well-documented in literature and their presence in industrial waste streams may have potentially toxic effect on animal and aquatic life. In fact, while organic pollutants can be subjected to degradation to harmless products, metals do not undergo degradation and can therefore accumulate in the fat tissues of living organisms, reaching concentrations in excess to those which originally existed in air or water.

In order to protect the environment from such contaminants, discharge of heavy metal containing waste streams is subject to strict regulations.

Electronic and pharmaceutical industries, for example, produce high volumes of industrial wastes having a particularly high content in heavy metals and copper ions. These effluents cannot be directly discharged in the environment and have to previously undergo an expensive treatment to ensure the reduction in their metal content.

More particularly, Italian law is very strict as far as the copper residual content dumped in the environment is concerned, setting a maximum tolerance of totally 0.4 ppm of copper in the wastes from a single industrial plant.

The process disclosed in the above cited WO 00/32303 for the recovery of iodine contained in solutions from wastes from the production of ionic and non-ionic contrast agents, makes use of copper ion or finely dispersed copper as a catalyst, in amounts ranging from 100 to 2,500 ppm and this can be an environmental problem.

In literature some processes are known for removing metal ions from aqueous solutions, but not from solutions deriving from the recovery of iodine from waste streams from the production of ionic and non-ionic X-ray contrast agents.

U.S. Pat. No. 5,122,279 discloses a process for removing the copper ion from a solution, which comprises treatment with ferrous dithionate to precipitate the corresponding metal complex from the solution, thus allowing for the metal to be separated.

Furthermore (see for example: U.S. Pat. Nos. 3,640,703, 3,790,370, 5,783,057) some chemical processes for the recovery of copper are known, which involve the use of sodium sulfide or hydrogen sulfide.

However these procedures, while easy to carry out in laboratory, are hardly industrially workable in that the addition of sodium sulfide or hydrogen sulfide causes unavoidable bad smell as well as a high contamination load.

U.S. Pat. No. 4,428,773 discloses a process for the treatment and recovery of copper and copper oxide from industrial wastes, in which copper and copper oxide are precipitated from the solution in alkali medium.

U.S. Pat. No. 4,343,706 discloses a process in which copper is recovered from industrial waste streams by precipitation from the solution at basic pH and in the presence of ferric ions, used both for their reducing properties and for their coagulant and flocculant properties.

Analogously, U.S. Pat. No. 5,472,618 discloses a method for recovering copper, which makes use of the reducing properties of a metal such as iron at acid pH and allows to recover the precipitated metal copper at the end of the treatment.

Some patents concerning the galvanic and metal working industries are known, which disclose (see for example U.S. Pat. Nos. 5,200,473, H0001661, 5,198,021, 4,070,281) the use of chelating cationic resins for removing metal ions from solutions containing the metal complexed for example with cyanide ions.

U.S. Pat. No. 5,262,018 discloses a process for the recovery of metals from solutions deriving from peroxy compounds, which comprises the use of ion exchange resins.

Similarly, the use of ion exchange resins for the recovery of metals is discloses in some process patents (see e.g. U.S. Pat. Nos. 5,907,037, 4,500,396, 5,907,037).

However, the cited literature describes processes for the recovery of both metal and ion copper which are either unsatisfactory or exceedingly costly for such an industrial application.

It has now surprisingly been found, and it is the object of the present invention, a process which, in addition to completely remove copper from the solution, also makes it possible to recover it in the form of a chloride or a sulfate so as to reuse it in the mineralisation process.

The process for the recovery of copper consists of multiple steps which are carried out considering the content in inorganic ions and organic products in the solution deriving from industrial waste streams from the production of ionic and nonionic iodinated X-ray contrast agents.

The present invention relates to a process for the recovery of copper from solutions deriving from the recovery of iodine from production wastes from the production of ionic and non-ionic iodinated X-ray contrast agents.

The process is particularly suitable when the above mentioned waste streams derive from the recovery of iodine by mineralisation with finely dispersed metal copper and copper ions solutions and comprises the following steps:

1. percolating the solution from industrial waste streams on chelating resins suitable for removing copper;
2. displacing copper and regenerating the resins with a 10% hydrochloric acid or 10% sulfuric acid solution.

Step 1 is conducted by percolation on iminoacetic, aminophosphonic or carboxylic resins and it allows to selectively retain copper while discharging the metal-free solution eluted from the column, thus avoiding environmental problems. Suitable resins are selected from the group consisting of: Duolite C467®, Amberlite IRC 86® and IRC 748®, or commercial equivalents thereof capable of selectively removing copper.

In case of industrial wastes containing high concentrations of chlorides, iodides, sulfates and organic compounds, a preliminary step is preferably carried out to make the recovery of the metal easier and to avoid any precipitations of impurities which could clog the resins.

In this case, the process involves a preliminary treatment of the solution from the effluents from the production of iodinated X-ray contrast agents, which comprises the following steps:

a) filtration through nanofiltration membranes to obtain the iodides in the permeate while retaining copper as a complexed divalent ion in the retentate;
b) oxidation and sublimation of molecular iodine by treating the permeate solution.

Nanofiltration of step a) allows to separate divalent ions from the monovalent ones and the compounds of molecular weight above 150–300 daltons from the smaller ones.

Polyamide membranes having a 98% $MgSO_4$ retention coefficient, for example DESAL5®, FILTEC® or commercially available analogues, make it possible to separate sodium iodide and sodium chloride from the high molecular organic compounds, phosphates, sulfates and copper as a divalent ion.

By this technique, iodides are fed to the iodine recovery process whereas the residue is treated to remove copper.

As high molecular compounds and di- and trivalent ions remain in the retentate, a solution free from iodides and chlorides is obtained, having a concentration up to 100–5000 ppm of copper. Permeation of iodides and chlorides can be monitored by using a conductimeter.

This operation provides an 80 to 98% copper recovery yield. Iodides are oxidized by addition of an oxidizer selected from the following: manganese dioxide, sodium chlorate, hydrogen peroxide, chlorine, sodium ipochlorite, nitrous acid, preferably sodium chlorate or hydrogen peroxide. The oxidizer concentration can range from 20% to 50% depending on the concentrations of the commercially available solutions. The oxidation can be effected at a temperature ranging from 20° C. to 100° C., under atmospheric pressure or at most 9 bars. The progress of the process can be monitored by means of the redox potential.

At the end of the oxidation, iodine is separated from copper by sublimation through injection of steam into the mixture. Iodine can be recovered either through a scrubber with water at 17° C. or by using 30% (w/w) sodium hydroxide which is subjected to dismutation to iodide and iodate.

The collected solution containing 100–2500 ppm of copper subsequently undergoes treatment for the recovery of the metal as already described at steps 1 and 2.

In some cases, the presence of sulfates, phosphates and organic compounds can cause severe packing problems and precipitation of solid product in resin beds, therefore adversely affecting the efficiency of the elution of the solution.

In order to avoid these problems and to remove tarry substances, a preliminary precipitation of these substances can be carried out by adding the same resin as used to fix copper, subsequently filtering the suspension through paper or sand filter. This operation is unsuited when the resulting solutions contain large amounts of suspended solids and the volumes of solution to treat are high.

This way, the iodine-containing solution is present in the permeate (which is subsequently oxidized) and the copper-containing solution in the retentate.

Alternatively to the precipitation step, the copper-containing solution from industrial waste streams from the production of ionic and non-ionic iodinated contrast agents can be filtered on a pre-column with sand filter, thereby removing the suspended organic compounds before carrying out the process of the invention.

The sand used for this purpose is quartz sand with about 60% 0.2–0.8 mm particle size distribution or sea sand with about 95% 0.1–0.3 mm particle size distribution. The choice depends on the characteristics of the particulate to be removed before the column treatment. The sand filter can be regenerated by back-washing.

This operation is necessary to remove some organic compounds which, if precipitated together with sodium sulfate, clog the resin thus making it useless during the solution percolation and metal recovery step.

The metal is subsequently recovered as a chloride or sulfate, during the resin regeneration step, by using a 5–10% (w/w) hydrochloric acid or sulfuric acid solution.

The solution from the regeneration step can be recycled to the mineralisation process either directly or after concentration. The overall recovery yield of copper is 80–90%. The solutions from this treatment have a copper residual concentration not higher than 1 ppm, preferably not higher than 0.4 ppm.

In this way, considering the other effluents from the treatment of the wastes from the production of contrast agents for the recovery iodine, contaminating effluents with a copper content below 0.4 ppm, which is the maximum value admitted by Italian law, can be fed, for example, to a plant for the biological treatment of contaminants.

The process of the invention is reported in greater detail in the experimental section.

The following examples illustrate the best experimental conditions to carry out the process of the invention.

Experimental Section

Analytical Procedure for the Determination of the Copper Content in Solution

The method reported in "Colorimetric methods of analysis" of Foster Dee Snell, Cornelia T. Snell and Chester Arthur Snell: Vol. II A, page 74 was followed, which method uses neocuproine (2,9-dimethyl-1,10-phenanthroline).

Reagents (analysis grade): Neocuproine, Hydroxylamine hydrochloride, 25% w/w ammonia, 36% w/w hydrochloric acid, sodium citrate, chloroform, absolute ethanol.

Apparatus: Spectrophotometer reading absorbance at 457 nm with at least 5 nm band resolution, 1 cm and 5 cm quartz cells.

Procedure: 20 ml of test solution containing about 0.1 mg of copper are added with 5 ml of 10% w/w hydroxylamine hydrochloride aqueous solution, 10 ml of 30% w/w sodium citrate aqueous solution are added, then pH is adjusted to 4–6 with 36% w/w hydrochloric acid or 25% w/w ammonia. 10 ml of previously prepared 1% w/w Neocuproine solution in absolute ethanol are added.

The solution is extracted in separatory funnel with 10 ml of chloroform and the extract is added to 4 ml of absolute ethanol.

The extraction is repeated on the residue with 5 ml of chloroform. The two extracts are combined in a 25 ml of class A beaker.

Absorbance at 457 nm is read in the spectrophotometer with 1 cm or 5 cm cuvetta, reading 0 for the test carried out with blanks.

The concentration is calculated by a calibration curve prepared with high purity electrolytic copper, starting from 0.4 ppm of copper when using 1 cm cells, and from 0.08 ppm of copper when using 5 cm cells. Calibration points depend on the type of concentration readings to perform.

EXAMPLE 1a 105 kg of waste solutions from Iopamidol industrial production are mineralised using 21 g of $CuSO_4.5\,H_2O$. The mixture is added to pH 13 with the addition 30% NaOH (w/w) and kept for six hours at 120° C. under these conditions.

Mineralisation is followed by concentration to 45% starting weight to obtain 48.1 kg of solution.

The resulting solution contains 1% of sodium iodide, 6% sodium sulfate decahydrate, a $CuSO_4$ amount equivalent to 21 g of $CuSO_4.5\,H_2O$, 40% of sodium chloride.

EXAMPLE 1b 23 kg from example 1a are adjusted to pH 9 with 50% sulfuric acid, then fed to a nanofiltration unit consisting of a membrane such as 8.36 m² Desal 5® and the solution is diafiltered, adding deionized water until complete removal of sodium iodide and sodium chloride. The removal is monitored by argentometric titration of halogens.

The resulting 23 kg retentate containing 110 ppm of $Cu^{2+}$ is percolated on 500 ml of Amberlite IRC 748® resin previously regenerated in the acidic form with 15% (w/w) sulfuric acid and subsequently deactivated with 4% (w/w) sodium hydroxide. The solution is eluted at a 8 beds/hour flow rate while monitoring the copper content in the instant eluate:

after 5 L $Cu^{2+}$<1 ppm
after 10 L $Cu^{2+}$<1 ppm
after 15 L $Cu^{2+}$<1 ppm
after 20 L $Cu^{2+}$5 ppm
after 23 L $Cu^{2+}$14 ppm The $Cu^{2+}$ content in the eluate is 0.8 ppm.

The resin is rinsed with 25 L of water at 50° C. to remove the retained organic compounds, then regenerated with 1 L of 15% (w/w) sulfuric acid.

The $Cu^{2+}$ content in the regeneration instant eluate is the following:

after 150 mL $Cu^{2+}$<5 ppm
after 300 mL $Cu^{2+}$<5 ppm
after 450 mL $Cu^{2+}$<5 ppm
after 600 mL $Cu^{2+}$<5 ppm
after 750 mL $Cu^{2+}$20 ppm
after 900 mL $Cu^{2+}$2100 ppm
after 1050 mL $Cu^{2+}$10200 ppm (starting washing with water)
after 1200 mL $Cu^{2+}$5200 ppm
after 1350 mL $Cu^{2+}$3100 ppm
after 1500 mL $Cu^{2+}$37 ppm
after 1650 mL $Cu^{2+}$<5 ppm A 900 ml central fraction with a 0.24% copper content is obtained, which is concentrated to obtain a 10% copper sulfate solution.

Copper recovery yield: 85.4%.

Example 2

23 kg of the solution from example 1a, containing 110 ppm of copper, are treated with 2 g of Duolite C467® previously regenerated to precipitate some organic compounds. The suspension is filtered through a fluted filter and washed with 1 L of water.

The resulting solution is percolated on 500 ml of Duolite C467® previously regenerated with 1N hydrochloric acid.

The instant copper content is monitored during elution:

after 5 L $Cu^{2+}$<1 ppm
after 10 L $Cu^{2+}$<1 ppm
after 15 L $Cu^{2+}$<1 ppm
after 20 L $Cu^{2+}$17 ppm
after 24 L $Cu^{2+}$21 ppm Mean content in the eluate: 8 ppm of copper.

The resin is regenerated using 1 L of 1N hydrochloric acid.

The resulting copper chloride aqueous solution is concentrated to obtain an about 5% solution which is recycled to the mineralisation process.

Copper recovery yield: 93%.

Example 3

23 kg of mineralisation solution containing 110 ppm of copper, obtained as described in example 1a, are adjusted to pH 1 with 50% (w/w) sulfuric acid.

30% (w/w) hydrogen peroxide is added, monitoring the redox potential with a platinum electrode at a temperature of 60° C. The addition is continued until steady potential at about 600 mV. When the potential exceeds this value, the addition is interrupted and steam is fed to the system. Iodine sublimates and is recovered with a scrubber with water at 17° C.

At the end of the operation, the presence of iodine is monitored by redox titration with 0.1 N thiosulfate.

The resulting solution is percolated on 500 mL of Duolite C 467® resin previously regenerated with hydrochloric acid.

In order to avoid clogging of the column, a 50 mL pre-column packed with sand is used. Quartz sand with about 60% 0.2–0.8 mm particle size distribution or sea sand with about 95% 0.1–0.3 mm particle size distribution can be used. The choice depends on the characteristics of the particulate to be removed before the column step. The sand filter can be regenerated by back-washing.

The resulting eluate has residual copper content of 1.5 ppm.

The resin is regenerated with 2N hydrochloric acid recovering all of the copper contained in the resin.

Copper recovery yield 92.2%.

The solution is directly recycled to the mineralisation step.

What is claimed is:

1. A process for the recovery of copper from waste streams deriving from the iodine recovery by copper mineralization of solutions from production processes of ionic or non-ionic iodinated X-ray contrast agents, comprising the following steps:
   1) filtering the iodine and copper-containing solution with nanofiltration membranes to obtain the iodides in the permeate while retaining copper, in the form of complexed divalent ion, in the retentate;
   2) oxidizing and subliminating molecular iodine by treating the permeate solution;
   3) percolating the solution obtained from step 2) on a chelating resins selected from iminoacetic, aminophosphonic or carboxylic resin suitable for removing copper;
   4) displacing copper and regenerating the resin with 10% hydrochloric acid solution or 10% sulfuric acid solution; and
   5) re-cycling of the solution obtained from step 4), either directly or after concentration, to the mineralization step.

2. A process as claimed in claim 1, wherein polyamide membranes are used.

3. A process as claimed in claim 1, wherein the oxidizing agent used in step 2) is selected from the group consisting of manganese dioxide, sodium chlorate, hydrogen peroxide, chlorine, sodium ipochlorite, and nitrious acid.

4. A process as claimed in claim 1, wherein the solution is subjected to preliminary precipitation of the solid compounds, by adding the same resin as used in step 3) and filtration of the final suspension.

5. A process as claimed in claim 1, wherein the solution is filtered through a sand filter pre-column.

6. A process as claimed in claim 1, wherein the waste streams are subjected to a preliminary oxidation treatment.

7. A process as claimed in claim 3, wherein the oxidizing agent is sodium chlorate.

8. A process as claimed in claim 3, wherein the oxidizing agent is hydrogen peroxide.

* * * * *